(12) United States Patent
Sarneel et al.

(10) Patent No.: US 8,512,791 B2
(45) Date of Patent: Aug. 20, 2013

(54) BAKERY PRODUCTS CONTAINING STARCH N-OCTENYL SUCCINATE

(76) Inventors: Frans Johan Sarneel, Zuiddorpe (NL); Johan Augusta Maria Antoon Peremans, Ekeren (BE)

( * ) Notice: Subject to any disclaimer, the term of this patent is extended or adjusted under 35 U.S.C. 154(b) by 1347 days.

(21) Appl. No.: 10/568,216

(22) PCT Filed: Jul. 28, 2004

(86) PCT No.: PCT/EP2004/008423
§ 371 (c)(1),
(2), (4) Date: Feb. 14, 2006

(87) PCT Pub. No.: WO2005/016006
PCT Pub. Date: Feb. 24, 2005

(65) Prior Publication Data
US 2006/0233931 A1    Oct. 19, 2006

(30) Foreign Application Priority Data
Aug. 18, 2003  (EP) .................................. 03255101

(51) Int. Cl.
*A21D 2/00*    (2006.01)
(52) U.S. Cl.
USPC ............. 426/549; 426/583; 426/94; 426/496; 426/578

(58) Field of Classification Search
None
See application file for complete search history.

(56) References Cited

U.S. PATENT DOCUMENTS

| | | | | |
|---|---|---|---|---|
| 4,103,038 A * | 7/1978 | Roberts | ......................... | 426/601 |
| 5,512,311 A | 4/1996 | Capitani et al. | | |
| 5,711,908 A | 1/1998 | Tiefenbacher et al. | | |
| 6,013,300 A * | 1/2000 | Reichkitzer et al. | .......... | 426/552 |
| 6,056,984 A * | 5/2000 | Ekanayake et al. | ........... | 426/120 |
| 6,558,730 B1 * | 5/2003 | Gisaw et al. | .................. | 426/637 |
| 6,663,909 B2 * | 12/2003 | Sarneel | ......................... | 426/549 |
| 2001/0055638 A1 * | 12/2001 | Takashima | .................... | 426/243 |
| 2002/0037351 A1 * | 3/2002 | Sarneel | ......................... | 426/549 |

FOREIGN PATENT DOCUMENTS

| | | |
|---|---|---|
| EP | 0 189 161 | 7/1986 |
| EP | 1 133 922 | 9/2001 |
| EP | 1 159 876 | 12/2001 |
| JP | 08196198 | 6/1996 |
| WO | WO03/067999 A1 * | 2/2003 |
| WO | WO 03/061404 | 7/2003 |
| WO | WO2004/084640 A2 * | 3/2004 |

* cited by examiner

*Primary Examiner* — Humera Sheikh
*Assistant Examiner* — Felicia King

(57) ABSTRACT

The present invention discloses a composition for use in bakery products characterized in that it consists of: starch n-octenyl succinate and whey protein, the use of such a composition to replace whole egg in bakery products and bakery products comprising the composition.

8 Claims, 1 Drawing Sheet

Sponge Cake Compressibility

| | Reference | 100% Egg replacement |
|---|---|---|
| After 2 days | 424 | 266 |
| After 7 days | 571 | 373 |
| After 15 days | 708 | 564 |

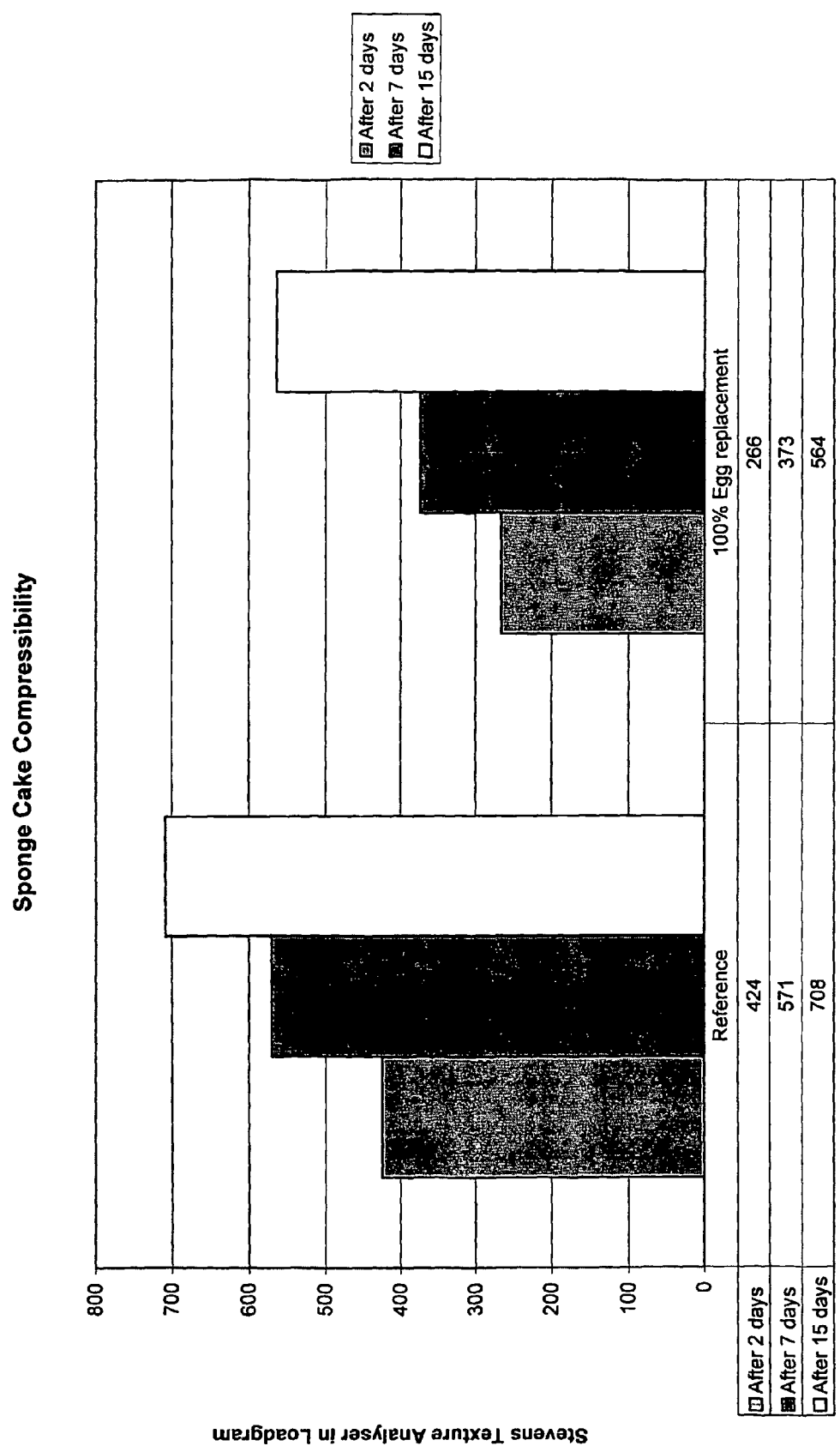

BAKERY PRODUCTS CONTAINING STARCH N-OCTENYL SUCCINATE

CROSS-REFERENCE TO RELATED APPLICATIONS

This application is a National Stage application under 35 U.S.C. §371 and claims benefit under 35 U.S.C. §119(a) of International Application No. PCT/EP2004/008423 having an International Filing Date of Jul. 28, 2004, which claims the benefit of priority of EP 03255101.2 having a filing date of Aug. 18, 2003.

TECHNICAL FIELD

The present invention relates to a composition comprising starch n-octenyl succinate ("n-OSA starch") and whey protein for use in bakery products. The invention further relates to dough or batter mixtures comprising said composition, to processes for preparing such products and to bakery products prepared according to such processes.

BACKGROUND OF THE INVENTION

In the food processing industry, including that of baked goods, it has, for a long time, been desirable to develop high quality, convenient foods, having ever longer shelf-lives, easier storage conditions and high appeal to sight, touch, taste and smell.

New trends such as more natural, healthier, more nutritious foods, environmental friendliness, freshness and clean label are also in demand.

One particular focus has been the replacement of egg yolk and/or whole egg in food stuffs. This not only leads to healthier (lower cholesterol) and cheaper foods, but can also extend shelf-life (although only insofar as proposed substitutes tend to remain edible, under normal storage conditions, for longer than eggs).

A number of egg substitutes have therefore been developed. For example, eggs have successfully been replaced by specially modified, emulsifying starches such as Cerestar's C*EmTex™ and National Starch and Chemical's N-Creamer 46™ in sauces, dressings and mayonnaise. There has also been some success in replacing eggs in baked goods. EP1159876A1, for example, discloses the use of starch n-alkenyl succinate for partial egg replacement. However, attempts to replace the entire egg content have, so far, been unsuccessful. It has indeed been observed that, if 100% of the egg content is replaced, dough volume is reduced leading to a dense, heavy texture in the final product, product height after cooking is diminished, crumb texture becomes hard, dry and crumbly after only short periods in storage and moisture is reduced resulting in decreased edibility.

Thus, there exists a need for an improved egg substitute, suitable for entire egg content replacement, for use in the preparation of high quality bakery products. The present invention provides such a substitute.

SUMMARY OF THE INVENTION

According to a first aspect of the present invention, there is provided a dry composition for use in bakery products characterised in that it comprises: 40-80% w/w starch n-octenyl succinate; and 10-40% w/w whey protein. Preferably, the composition will comprise 40-60% w/w starch n-octenyl succinate; 10-30% w/w whey protein and 20-40% w/w untreated starch.

According to a second aspect, there is provided a liquid composition characterised in that it comprises a dry composition as defined above, water (or a water-miscible liquid) and, optionally, one or more flavouring(s), colorant(s), vitamin(s) and/or mineral(s).

According to a further aspect of the present invention, there is provided the use of said dry or liquid composition for replacing whole egg in bakery products.

According to another aspect of the present invention, there is provided a dough or batter mixture for use in preparing a bakery product comprising said dry or said liquid composition together with one or more additional ingredients. Preferably, said dough or batter mixture will comprise 0.5-20% w/w of said dry composition or 2.5-40% w/w of said liquid composition.

In a further aspect, the present invention provides a dough or batter mixture for use in preparing a bakery product comprising: 10-20% w/w flour; 1-15% w/w starch n-octenyl succinate; 0.1-7% w/w whey protein; 0-40% w/w egg; and 0-10% w/w emulsifier. The mix may also contain 0.5-20% w/w untreated starch.

The dough or batter mixture according to the invention may be used in the preparation of bakery products such as pound cake, sponge cake, chiffon cake, cheese cake, fruitcake, layer cake or gingerbread. Preferably, the dough or batter mixture will be used in the preparation of a sponge cake.

According to yet another aspect of the present invention there is provided a process for preparing bakery products characterised in that is comprises: (a) preparing a mixture of n-OSA starch, whey protein and, optionally, an untreated starch, water and/or a water-miscible liquid; (b) combining the mixture of step (a) with other ingredients for obtaining a dough or batter; and (c) baking the dough or batter. The "other ingredients" of step (b) will include flour and, optionally, one or more of: egg, emulsifier(s), water and/or water miscible liquid(s), raising agent(s), sweetener(s), fat(s), flavouring(s), colorant(s), vitamin(s) and mineral(s). Preferably, step (c) will be carried out at a temperature in the range 140-190° C. (even more preferably, for 100% egg replacement, step (c) will be carried out at about 160° C.) and in a non-coated receptacle.

In an additional aspect of the invention, there is provided a bakery product prepared according to the above process.

DESCRIPTION OF THE FIGURES

FIG. 1: Graph comparing compressibility in conventional sponge cakes and in egg free cakes of the invention.

DETAILED DESCRIPTION OF THE INVENTION

The present invention discloses a dry or liquid composition for use in bakery products comprising n-OSA starch and whey protein.

The n-OSA starch may be from a variety of sources such as maize, waxy maize, potato, waxy potato, pea, rice, wheat, cassaya, sorghum, tapioca and the like. Preferably, it will be derived from a high amylopectin source, e.g. waxy maize or waxy potato.

The n-OSA starch may be thinned (by acid or enzymatic thinning), undextrinised, dextrinised, granular (cook-up), pregelatinised (roll-dried) and/or stabilised. Alternatively, it may be a mixture of two or more of such n-OSA starches. According to a preferred embodiment, the n-OSA starch will be a granular starch. The degree of substitution of the n-OSA starch will preferably vary between 0.2 to 3%, even more preferably between 0.5 to 2.5%. The degree of substitution can be determined by HPLC.

n-OSA starch accounts for 40-80% of the total weight of the dry composition of the present invention. Preferably, it will account for 40-60% of the total weight.

The composition of the present invention may also comprise an "untreated" starch, so-called to distinguish it from the n-OSA starch. The untreated starch can be unmodified (native) or modified (e.g. etherified, esterified, phosphated, cross-linked and the like) and, according to one embodiment, will account for 20-40% (preferably 25-35%) of the total weight of the dry composition. As for the n-OSA starch, the untreated starch may be from any source but will preferably be a maize starch.

Whey protein, finally, accounts for 10-40% (preferably 10-30%) of the total weight of the dry composition. It can be isolated or purified from milk using any method known to the person skilled in the art.

If necessary, before use, water and/or a water-miscible liquid (such as milk or alcohol for example) may be added to the dry composition. Accordingly, the present invention also provides a liquid composition comprising both the dry composition as defined above and water (or a water-miscible liquid). The liquid composition may further comprise one or more flavouring(s), colorant(s), vitamin(s) and/or mineral(s).

As the composition (the term "composition", as used herein, referring to either the dry or liquid composition) of the present invention is to be used as an egg substitute, the quantity of water (or water miscible liquid) in the liquid composition should compensate for any loss of liquid caused by omitting the eggs. The ratio of dry composition to water (or water-miscible liquid) in the liquid composition should therefore preferably be 35:65. Even more preferably, it should be 45:55. Of course, the quantity of water (or water miscible liquid) present in the liquid composition will vary depending on the amount of liquid already present in the dough or batter to which it is to be added.

In its final form, the (dry or liquid) composition of the present invention is an effective egg substitute for use in bakery products. Thus, the present invention further relates to the use of this composition in bakery products in which it is desired to reduce cholesterol levels and/or to extend shelf-life. In addition, it has surprisingly been found that the composition of the present invention contributes to a more tender crumb, thereby improving product edibility. The present invention therefore further relates to bakery products comprising the composition defined above and to dough or batter mixtures for use in preparing such products.

According to one embodiment, the dough or batter mixture will comprise (together with one or more additional ingredients) 0.5-20% w/w, preferably 2.5-10% w/w, of the above dry composition or 2.5-40% w/w, preferably 5-35% w/w, of the above liquid composition. Specifically, the mixture should comprise 10-20% w/w flour, 1-15% w/w n-OSA starch and 0.1-7% w/w whey protein. Preferably, the mixture should comprise 10-15% w/w flour, 4-12% w/w n-OSA starch and 1-6% w/w whey protein. Accordingly, in one particular embodiment, the dough or batter mixture of the present invention will comprise 17-18% w/w flour, 7-8% w/w n-OSA starch and 2-3% w/w whey protein.

As noted above, the flour content of the dough or batter mix may be replaced, in part, by untreated starch, such as untreated maize starch. If used, the untreated starch should account for 0.5-10% by weight, preferably 2-8% by weight of the overall mix. What is more, and depending on the type of flour used (in particular, if very high-protein flours are used), the dough or batter mix may contain up to 10% w/w additional untreated starch. Accordingly, the mixture of the invention may comprise, in total, 0.5-20% w/w untreated starch. Preferably, it will comprise a total of 2-12% w/w untreated starch. Thus, in one particular embodiment, the mixture may comprise 12-14% w/w flour, 7-8% w/w n-OSA starch, 2-3% w/w whey protein and a total of 10-12% w/w untreated starch (e.g. 6-7% w/w untreated wheat starch+4-5% w/w untreated maize starch).

The flour used in the above dough or batter mixture may be from any source (e.g. corn flour, soy flour or wheat flour). Most preferably, however, it will be wheat flour. It is the protein of wheat flour, gluten, which distinguishes it from other flours and makes it of particular value in the baking industry. In hard, high-protein wheats, there is more gluten in the endosperm and the starch cells are firmly cemented together. In soft, low-protein wheats the bonding is not so firm. For most cakes a soft, low-protein flour is needed for obtaining a tender cake. Flours used for pan bread production will generally be milled from hard wheats of high protein content, although soft wheats can give optimum quality in the type of bread that is most popular in some countries. Ideally, the flour will be non-chlorinated. It has indeed been found that that certain starches—such as those used in the present invention (i.e. n-OSA starch)—can be used to supplement non-chlorinated flour whilst maintaining characteristics such as dough volume, crumb hardness and bakery product volume comparable to those of products prepared with chlorinated flour (the use of which is now banned in many countries).

The dough or batter mixture of the present invention may also comprise up to 40% egg. Indeed, although the composition of the present invention is a highly efficient egg substitute, it does not have to be used for entire egg replacement. Nonetheless, the mixture will preferably contain less than 25% w/w egg. Even more preferably, it will contain less than 15% w/w egg. The term "egg" is used herein to refer to whole egg content or partial egg content. In the present context, "partial egg content" means, for example, the egg yolk constituent of a cake mix whereas "whole egg content" means both egg yolk and egg white. In a preferred embodiment, the composition of the present invention is used to replace whole egg content, either in part or entirely. Any egg, if present, may be added in liquid form, powder form or a mixture of the two.

The dough or batter mixtures of the invention may also include an emulsifier (0-10% w/w, preferably 0-5% w/w, even more preferably 0-3% w/w). Any food grade emulsifier, such as lecithin, can be used.

Additional ingredients, if necessary, will be apparent to a person skilled in the art. They may include, for instance: raising agents (such as baking powder and/or yeast), water and/or water miscible liquids (such as milk, alcohols, etc.), sweeteners (e.g. sugar or artificial sweeteners), fat (e.g. margarine, oil, etc.), flavourings (e.g. synthetic or natural flavourings such as vanilla, caramel and/or almond flavourings; fruit juices such as orange, grapefruit, pear, cherry, raspberry and/or blackcurrant juices; vegetable extracts such as tomato, carrot, onion and/or garlic extracts; spices; herbs; etc.) and/or one or more natural or synthetic colorants. Optionally, vitamins (such as vitamins A, D3, E, K1, C, B1, B2, B5, B6, B12 and PP, folic acid and biotin) and minerals (such as sodium, potassium, calcium, phosphorus, magnesium, chloride, iron, zinc, copper, manganese, fluorine, chromium, molybdenum, selenium and iodine) can also be added.

The choice of additional ingredients will depend, of course, on the bakery product being produced. Indeed, the composition according to the present invention can be used in the manufacture of bakery products such as pound cake, sponge cake, chiffon cake, cheesecake, fruitcake, layer cake and gingerbread. Preferably, the bakery product according to the present invention will be a sponge cake. Ideally, the dough or batter mixture for use in preparing such a sponge cake will comprise 10-15% w/w flour, 5-10% w/w n-OSA starch and 1-4% w/w whey protein. It may also comprise, for example, 4-15% w/w untreated starch, 20-30% w/w sugar, 0-2% w/w raising agent and 30-40% w/w water.

It has surprisingly been found that products prepared using the composition of the present invention have comparable properties (in terms of dough viscosity, specific dough volume, specific cake volume and height, shelf-life, crumb texture, etc.) to those prepared with a traditional egg content.

For optimum quality, the products according to the present invention should be prepared according to a process comprising the following steps:
a) Preparing a mixture of flour, n-OSA starch, whey protein and, optionally, untreated starch, water and/or a water miscible liquid;
b) Combining the mixture of step (a) with other ingredients for obtaining a dough or a batter, and
c) Baking the dough or batter.

The untreated starch, water and/or water miscible liquid optionally added to the dry composition at step (a) may also be added as "other ingredients" at step (b). Alternatively, they may be added in part at step (a) and in part at step (b). In any event, sufficient water (or water miscible liquid) should be added to compensate for the removal, in whole or in part, of the liquid egg component. For example, if 100% egg is replaced, for every 35 parts of dry composition according to the invention that are added, the dough or batter should comprise approximately 65 parts water (or water miscible liquid).

Apart from water, possible "other ingredients" as referred to in step (b) would be apparent to a person skilled in the art, depending on the eventual end product sought. Examples have been set out above and include flour, emulsifier, egg, raising agents, sweeteners and fat.

Preferably, step (c) of the above process is carried out at a temperature in the range 140-190° C. Advantageously, cooking temperature will be adjusted to reflect the make-up of the dough or batter and, in particular, its egg content. Thus, for example, if 25% of the whole egg content has been replaced by the composition of the present invention, step (c) should be carried out at approximately 180° C. Alternatively, if 50% of the whole egg content has been replaced, step (c) should be carried out at approximately 170° C. and if 100% of the whole egg content has been replaced, step (c) should be carried out at approximately 160° C. Advantageously, step (c) should be carried out in a non-coated receptacle, preferably in an iron receptacle. Baking time will depend on cooking temperature, quantity of dough and size and depth of the baking receptacle. On average, however, cooking time will be approximately 25-45 minutes.

The bakery products obtained according to the above process also form part of the present invention which is illustrated in the following examples.

Example 1

Egg Replacement in Sponge Cake

Recipe

Four cake mixes (Trials 1-4) were prepared as shown in Table 1.

TABLE 1

| Ingredients (g) | 1 | 2 | 3 | 4 |
|---|---|---|---|---|
| flour | 160 | 160 | 160 | 120 |
| C*Gel 20006 [a] | 62 | 62 | 62 | 62 |
| C*EmTex 06328 [b] | 0 | 34.5 | 69 | 69 |
| C*Gel 03401 [c] | 0 | 0 | 0 | 40 |
| Sugar | 230 | 230 | 230 | 230 |
| Baking powder | 8 | 8 | 8 | 8 |
| BV40 (DMV) | 30 | 30 | 30 | 30 |
| Whey protein (DMV) | 0 | 0 | 25 | 25 |
| Water | 130 | 233 | 336 | 336 |
| Liquid eggs | 275 | 137.5 | 0 | 0 |
| Total | 895 | 895 | 920 | 920 |

[a] C*Gel 20006 = native wheat starch;
[b] C*EmTex 06328 = n-OSA starch;
[c] C*Gel 03401 = native maize starch Procedure All ingredients were mixed in a Hobart mixer during 6 minutes at high speed. The dough was then poured into a greased/floured tins (400 g of dough for tins having a diameter of 26 cm and 300 grams for a tins of 22 cm). The dough was baked for 30-36 minutes at 160-180° C. in a tray oven. Cooking details are shown in Table 2.

TABLE 2

| Trial No. | Composition of Cake Mix (Egg replacement by C*EmTex 06328) | Baking temperature |
|---|---|---|
| 1 | Standard (0% egg replacement) | 180° C. |
| 2 | 50% Egg replacement | 170° C. |
| 3 | 100% Egg replacement + Whey Protein | 160° C. |
| 4 | 100% Egg replacement + Whey Protein + 25% of flour replaced by C*Gel 03401 | 160° C. |

Results

The viscosity of the dough was determined, immediately after preparing the dough, by Stevens Texture Analyser using a cone and measuring at a penetration of 30 mm. Cake height was determined after baking. The results obtained are set out in Table 3.

TABLE 3

| | Trial No. | | | |
|---|---|---|---|---|
| | 1 | 2 | 3 | 4 |
| Specific Volume of dough (cm3/g) | 3.26 | 3.1 | 3.23 | 3.25 |
| Height of cake (mm) | 50 | 46 | 46 | 49 |

Crumb hardness was determined after packaging the bakery products and storing them at 20° C. for 2 days, 7 days and 15 days, respectively. Crumb hardness was measured with Stable Micro Systems texture analyser. The results are illustrated in FIG. 1.

Analysis

Sponge cake without egg replacement gives a higher specific dough volume than cakes in which egg has been replaced, even if only partially, by n-OSA starch. There is, moreover, a particularly notable and unacceptable drop in volume when the entire egg content is replaced solely by n-OSA starch (the above results only show 50% egg replacement with n-OSA starch but dough volume already shows some deterioration. At 100% egg replacement, the deterioration is very considerable). However, when egg is replaced by the composition of the present invention, specific dough volume is not affected, i.e. it remains almost identical to that of a standard sponge cake mix, even at 100% replacement.

Similarly, sponge cake without egg replacement has a better cake height than cakes in which egg has been replaced by n-OSA starch alone (again, the above results only show 50% egg replacement with n-OSA starch but cake height already shows some deterioration. At 100% egg replacement, the deterioration is very considerable). However, this loss is avoided by replacing egg with the composition of the present invention. Even at 100% replacement, cake height remains almost identical to that of standard sponge cake.

Turning to crumb hardness, it is clear from the results shown in FIG. 1 that cakes produced with the composition of the present invention have better crumb texture than those produced using egg. Moreover, this improvement is maintained over time (even after 15 days, crumb hardness is more than 20% higher in conventional cakes than in products containing the composition of the present invention) thus effectively extending the shelf life of the bakery product.

Example 2

Egg and Flour Replacement in Sponge Cake Recipe

Five cake mixes (Trials 1-5) were prepared as shown in Table 4. Trial 1 is the reference or "standard" formula. Trial 2 represents a 100% egg replacement with n-OSA starch. Trial 3 shows the effect of 100% egg replacement with n-OSA starch and whey protein. Finally, trials 4 and 5 repeat trials 2 and 3, respectively, but with, in addition, a 25% replacement of flour by untreated maize starch.

TABLE 4

| Ingredients (g) | 1 | 2 | 3 | 4 | 5 |
| --- | --- | --- | --- | --- | --- |
| Duo flour (Ceres) | 160 | 160 | 160 | 120 | 120 |
| C*Gel 20006 [a] | 62 | 62 | 62 | 62 | 62 |
| C*EmTex 06328 [b] | 0 | 69 | 69 | 69 | 69 |
| C*Gel 03401 [c] | 0 | 0 | 0 | 40 | 40 |
| Sugar | 230 | 230 | 230 | 230 | 230 |
| Baking powder (Dohler) | 8 | 8 | 8 | 8 | 8 |
| BV40 (DMV) | 30 | 30 | 30 | 30 | 30 |
| Whey protein (DMV) | 0 | 0 | 25 | 0 | 25 |
| Water | 130 | 336 | 336 | 336 | 336 |
| Liquid eggs | 275 | 0 | 0 | 0 | 0 |
| Total | 895 | 895 | 920 | 895 | 920 |

[a] C*Gel 20006 = native wheat starch;
[b] C*EmTex 06328 = n-OSA starch;
[c] C*Gel 03401 = native maize starch Procedure All ingredients were mixed in a Hobart mixer during 6 minutes at high speed. The dough was then poured into greased/floured tins (400 g of dough for each 26 cm diameter tin) and cooked for 36 minutes at 160° C.

Results

The viscosity of the dough was determined, immediately after preparing the dough, by Stevens Texture Analyser using a cone and measuring at a penetration of 30 mm and at a speed of 20 mm/s. Both dough viscosity and specific dough volume were determined at 23° C. Cake height, crumb structure and edibility were determined after baking. The results obtained are set out in Table 5.

TABLE 5

| | Trial No. | | | | |
| --- | --- | --- | --- | --- | --- |
| | 1 | 2 | 3 | 4 | 5 |
| Specific dough volume (cm³/g) | 3.26 | 2.75 | 3.23 | 2.76 | 3.25 |
| Dough viscosity in loadgram | 36 | 34 | 39 | 35 | 41 |
| Cake height (mm) | 52 | 39 | 46 | 46 | 49 |
| Crumb structure | Coarse | Too compact + rubbery | Very fine + compact | Too compact + rubbery | Very fine + regular pores |
| Edibility | Dry + crumbly | | Extremely soft | | Extremely soft |

Analysis

Sponge cake without egg replacement gives a (more than 15%) higher specific dough volume than cakes in which the entire egg content has been replaced by n-OSA starch. However, when egg is replaced by the composition of the present invention, specific dough volume is not affected, i.e. it remains almost identical to that of a standard sponge cake mix.

Similarly, sponge cake without egg replacement has a (25%) better cake height than cakes in which the entire egg content has been replaced by n-OSA starch. Again, however, this loss is avoided by replacing egg with the composition of the present invention with cake height remaining almost identical to that of standard sponge cake.

Turning to crumb structure and edibility, it can be seen that cakes in which egg content has been replaced by n-OSA starch have an undesirable texture. By comparison, cakes produced with the composition of the present invention not only have much improved characteristics, they also actually have better crumb structure and edibility than cakes produced using egg.

The invention claimed is:

1. A process of preparing a bakery product, consisting of:
   a) providing:
      (i) a dry composition consisting of 40-80% w/w starch n-octenyl succinate and 10-40% w/w/ whey protein; or
      (ii) a liquid composition consisting of 40-80% w/w starch n-octenyl succinate, 10-40% w/w whey protein, and water or a water-miscible liquid;
   b) combining the dry composition or the liquid composition with flour and one or more other ingredients to produce a dough or batter, wherein the one or more other ingredients are selected from the group consisting of untreated starch, baking powder, yeast, water, sweeteners, sodium flavoring, colorants, fat, and emulsifiers, wherein the one or more other ingredients is not whole egg; and
   c) baking the dough or batter to produce a bakery product, wherein the bakery product:
      (i) has a lower cholesterol content than a bakery product that includes whole egg; and
      (ii) has a longer shelf-life than a bakery product that includes whole egg.

2. A process according to claim 1, wherein the combining step further includes untreated starch.

3. A process according to claim 2, wherein the untreated starch is untreated maize starch.

4. A process according to claim 1, wherein the baking step is carried out at a temperature of 160° C.

5. A process according to claim 1, wherein the baking step is carried out in a non-coated receptacle.

6. A process according to claim 5, wherein the non-coated receptacle is an iron receptacle.

7. A bakery product made according to the process of claim 1.

8. A dry composition for use in bakery products consisting of:
- 40-60% w/w starch n-octenyl succinate;
- 10-30% w/w/ whey protein; and
- 20-40% w/w/ untreated starch.

* * * * *